United States Patent [19]

Vinod

[11] Patent Number: 5,348,785
[45] Date of Patent: Sep. 20, 1994

[54] METHOD FOR MANUFACTURING A CARPET HAVING A SECONDARY BACKING SUBSTANTIALLY IMPERVIOUS TO AQUEOUS SOLUTIONS AND THE RESULTANT CARPET

[75] Inventor: Yashavant V. Vinod, Hockessin, Del.

[73] Assignee: E. I. du Pont de Nemours and Company, Wilmington, Del.

[21] Appl. No.: 178,992

[22] Filed: Jan. 7, 1994

[51] Int. Cl.$^5$ .................. B32B 5/26; B32B 33/00
[52] U.S. Cl. ................................ 428/95; 156/278; 156/280; 428/96
[58] Field of Search .................. 428/95, 96; 156/278, 156/280

[56] References Cited

U.S. PATENT DOCUMENTS

| | | | |
|---|---|---|---|
| 4,579,762 | 4/1986 | Veci | 428/95 |
| 4,619,853 | 10/1986 | Blyth et al. | 428/95 |
| 4,643,930 | 2/1987 | Veci | 428/96 |

*Primary Examiner*—James C. Cannon

[57] ABSTRACT

This invention relates to methods for making a carpet having a secondary backing which is substantially impervious to aqueous solutions. The process involves applying a fluorochemical onto the underside of a secondary backing material, followed by drying and curing of the fluorochemical. This invention also includes the resultant carpets prepared from such a process.

10 Claims, 1 Drawing Sheet

METHOD FOR MANUFACTURING A CARPET HAVING A SECONDARY BACKING SUBSTANTIALLY IMPERVIOUS TO AQUEOUS SOLUTIONS AND THE RESULTANT CARPET

BACKGROUND OF THE INVENTION

1. Field of the Invention

This invention relates to a novel process for making a carpet having a secondary backing which is substantially impervious to aqueous solutions. The process involves applying a fluorochemical onto the underside of a secondary backing material. The invention also encompasses carpets made from such a process.

2. Description of Related Art

The majority of residential and commercial carpets are constructed in the following general manner. Carpet pile yarn is first inserted through a primary backing fabric to form tufts of yarn projecting from the surface of the fabric. The primary backing is then coated with a polymeric latex to lock the yarn tufts in place and to provide an adhesive for a secondary backing fabric. The latex-coated primary backing is then bonded to the secondary backing to form a laminated backing structure.

However, one problem with the above-described carpets is their susceptibility to penetration by aqueous solutions. For instance, if water or a water-based substance (soda pop, coffee, urine, etc.) is spilled onto the carpet face, it may permeate through the primary and secondary backings and onto the underlying material (carpet underpad, hardwood floors, etc.). The underlying material may become stained and deteriorate over a period of time. Mildew may also grow on the backing and underlying material.

Those skilled in the trade have considered different ways for manufacturing carpets in order to reduce the permeability of liquids through the primary backing material.

One method involves applying a fluorochemical or other water-repellent agent onto the face fiber of the carpet during the carpet-manufacturing process. In such instances, the fluorochemicals serve to reduce the wettability of the fibers in the finished carpet such that a spilled liquid will initially "bead" on the surface of the fiber. However, if the beaded liquid is not promptly removed, it will eventually be absorbed by the fibers and may penetrate through the primary backing.

Another method for making the primary backing impervious to liquids involves mixing fluorochemicals into the latex composition and then coating the primary carpet backing with the fluorochemical-containing latex.

For instance, Ucci, U.S. Pat. No. 4,643,930, discloses a carpet structure having a primary backing tufted with nylon yarns. The yarns are coated with a fluorochemical to improve the soil resistance of the carpet. The underside of the primary backing is coated with a latex containing fluorochemicals mixed therein such that the primary backing is made substantially impervious to water.

Blyth et al., U.S. Pat. No. 4,619,853 also discloses nylon carpets having a primary backing coated with a latex containing fluorochemicals mixed therein. In addition, the nylon yarns are coated with sulfonated phenol or naphthol-formaldehyde condensate to improve the stain resistance of the carpet's surface.

Ucci, U.S. Pat. No. 4,579,762 also discloses nylon carpets having a primary backing which is coated with a fluorochemical-containing latex. In this instance, the nylon yarns are made from a modified nylon polymer containing aromatic sulfonate units to improve the stain-resistance of the carpet's surface.

Although the foregoing methods may be somewhat effective for providing the primary backing with water impermeability properties, such methods may restrict the flexibility of the carpet manufacturing operation. For example, it may not be possible to continuously convert a commercial production unit in order that batches of fluorochemical-containing latex are applied to some primary backings, while batches of standard, non-fluorochemical-containing latex are applied to other primary-backings. Additionally, in some instances, stainings on carpets having impervious primary backings may be more visible since the stain will not penetrate into the primary backing, but may spread across the face of the carpet. In cases of wall-to-wall carpeting, the stains may spread into undesirable areas, such as the corners in a room. In addition, if such carpets also have a secondary backing, the latex containing the mixed fluorochemicals may reduce the adhesion between the primary and secondary backings, thus reducing the delamination strength of the carpet.

In view of the above disadvantages, it would be desirable to have a method for making the secondary backing of a carpet substantially impervious to aqueous solutions, and such a method should also be commercially flexible for the manufacturing of carpets. The present invention provides such methods as well as the resultant carpets having a secondary backing substantially impervious to aqueous solutions.

SUMMARY OF THE INVENTION

This invention is directed to methods for constructing a carpet having a secondary backing which is substantially impervious to aqueous solutions. One method involves first contacting a tufted primary backing with a secondary backing. Preferably, the primary backing is tufted with polyamide (nylon) yarns. The secondary backing material comprises a surface and an underside. The surface of the secondary backing is contacted with an adhesive-coated tufted primary backing. A fluorochemical is applied to the underside of the secondary backing in an amount sufficient to render the secondary backing substantially impervious to aqueous solutions. The fluorochemical is then dried and cured, such as by heating the carpet at a temperature in the range of 250° to 400° F. Certain fluorochemicals may dry and cure at room temperature. Another method involves applying the fluorochemical onto the underside of the secondary backing prior to contacting the primary and secondary backings with each other. The fluorochemical may also be applied onto the underside of a finished carpet having a secondary backing. In other instances, the fluorochemical may be applied to the upper surface of the secondary backing, provided that the fluorochemical is first dried and cured before the secondary backing is laminated to the adhesive-coated primary backing. This invention also includes the resultant carpets made from such methods.

DETAILED DESCRIPTION OF THE INVENTION

Figure 1:
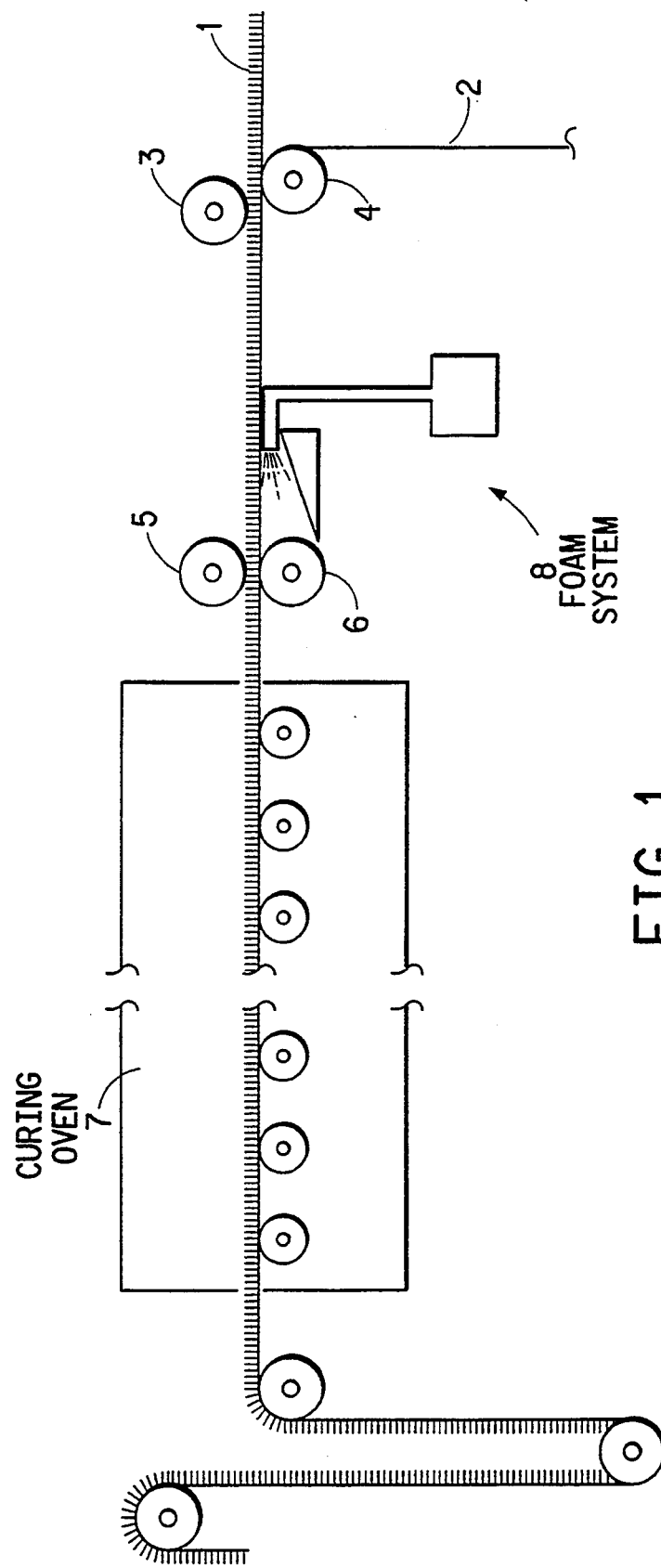
FIG. 1 is a schematic view of a method of the present invention illustrating the foam application of fluorochemical to the underside of a secondary backing.

The present invention provides a process for constructing a carpet having a primary backing and a secondary backing, wherein a fluorochemical is applied to the underside of the secondary backing such that the carpet is rendered substantially impervious to aqueous solutions. By the phrase, "substantially impervious to aqueous solutions" as used herein, it is meant that water or a water-based solution will not substantially penetrate through the secondary backing in accordance with the testing methods described below.

Generally, the pile yarns for the carpets of this invention may be prepared by conventional techniques. These yarns are composed of multiple filaments which are formed from synthetic or natural polymers, such as wool. Typical synthetic fiber-forming polymers include, for example, polyolefins such as polypropylene, polyamides such as polyhexamethylene adipamide (nylon 6,6) and polycaprolactam (nylon 6), polyesters such as polyethylene terephthalate, and acrylics. Copolymers, terpolymers, and melt blends of such polymers are also suitable.

In a nylon-filament forming process, the molten polymer is extruded through a spinneret into a quenching medium, where the polymer cools and solidifies to form filaments. After drawing, the filaments may be crimped and cut into short lengths to make staple fiber, or bulked to make bulked continuous filaments (BCF).

The yarns may then be tufted into a primary backing fabric by techniques known in the trade. Alternatively, the carpets can be woven or needle-punched. The backing may be a woven material made from natural or synthetic materials, such as, jute, wool, rayon, polyamides, polyesters, or polyolefins. Nonwoven backings may also be used. The carpet is then typically dyed, rinsed, and subjected to other standard finishing operations including stain-resist and soil-resist treatment of the yarn tufts.

A latex of a synthetic polymer is then applied to the underside of the primary backing fabric to lock the tufts in place and to provide an adhesive for a secondary backing material. Any suitable adhesive polymeric latex may be used. The latex typically includes a filler material such as calcium carbonate, silica, talc, or clay. Examples of suitable polymers for preparing such latex compositions include styrene/butadiene copolymers, ethylene/vinyl acetate copolymers, polyacrylates, and blends thereof. Generally, the amount of latex applied to the primary backing is in the range of about 18 to 40 ounces per square yard of primary fabric. Alternatively, the primary backing may be coated with a hot melt adhesive, as described in Reith, U.S. Pat. Nos. 4,844,765 and 4,939,036.

The latex-coated tufted primary backing is then brought in contact with a secondary backing material. Different secondary backing materials known in the trade may be used including jute, woven tapes of polypropylene, plain woven polypropylene fabrics, felts, and thermoplastic polymer films. Often, the upper surface of the secondary backing will also be coated with a small amount of latex to improve the adhesiveness between the latex-coated underside of the primary backing and the upper surface of the secondary backing. Referring to FIG. 1, the contacted primary (1) and secondary (2) backings adhere to each other as the backings pass between upper (3) and lower (4) marriage rolls. The fluorochemical may then be applied to the underside of the secondary backing material.

Suitable fluorochemicals for use in this invention generally include, but are not limited to, polymers or compounds with molecular weights of greater than 500 having pendent or end groups of perfluoroalkyl moieties. Examples of some suitable fluorochemicals include polyvinyldiene fluoride, polytetrafluoroethylene, 2-perfluorooctylethyl acrylate and blends of such compounds with methyl methacrylate, butyl methacrylate, modified wax emulsions, polyvinylidene chloride, and ethyl methyl acrylate. Commercially available fluorochemicals such as "TEFLON", "DURATECH", and "ZONYL" from DuPont Co., "SCOTCHGARD" from 3M, and "SOFTECH" from Dyetech, "TEXTEL" from Atochem, and "NK GUARD" from Nicca, may be used. It is also recognized that hydrocarbon and silicone-based water repellents, as well as acrylic resins and modified wax emulsions, may also be used.

The fluorochemical may be applied to the underside of the secondary backing by various means, including foam, spray, or padding methods. FIG. 1 illustrates a foam application system. After the foam has been applied, the primary and secondary backing materials are passed between upper (5) and lower (6) nip (press) rolls, whereby the primary and secondary backing materials are pressed together and laminated. The entire carpet structure is then subjected to heat-treatment in order that the fluorochemical may be dried and cured onto the secondary backing. Typically, the carpet structure will be positioned on a tenter frame and passed through a conventional latex curing oven (7), wherein the latex is also dried and cured. Although the heating temperature may vary depending upon the type of pile yarn, latex composition, fluorochemicals, and backing materials used, the temperature inside the oven should generally be in the range of 250° to 400° F.

The methods and resultant carpets of this invention, as described above for example, offer several advantages over carpets of the prior art. For instance, the primary backing of the carpets in this invention may be permeable to aqueous solutions. Thus, any spilled liquids will not unduly spread across the face fiber of the carpet, but will become entrapped between the face fiber and the underside of the secondary backing. These spilled liquids may then be removed by vacuuming, sponging, or any other appropriate means. The methods of this invention are also commercially flexible, since such foam and spray fluorochemical systems may be easily installed.

Alternatively, it is understood that the fluorochemical may be applied onto the underside of the secondary backing prior to contacting the primary and secondary backings with each other.

It is also recognized that certain fluorochemicals may be applied onto the underside of the secondary backing after the carpet structure has passed through the latex curing oven. For instance, some fluorochemicals, such as "TEFLON" MF available from DuPont Co., cure at room temperature. Thus, it is not necessary for such fluorochemicals to be heat-treated in order for curing to take place. These room temperature-curable fluorochemicals may simply be sprayed onto the secondary backing of the finished carpet.

In a preferred embodiment, the fluorochemical is applied onto the secondary backing by a foam applicator (8) subsequent to the primary and secondary backings passing between the marriage rolls (3,4) and prior to the backings passing between the nip (press) (5,6) rolls. In such a method, a foamable mixture containing the fluorochemical and foaming agents is first prepared by techniques known in the art. Suitable foaming agents include KAF 300S, available from Peach State Labs and Dextrol Foamer 916, available from Dexter Chemicals, Inc.

The foamable mixture can then be generated into foam and applied through a commercial foam generator. It is important that the foam be stable in order that it may be applied uniformly along the secondary backing. Generally, the foam application conditions are adjusted to obtain the desired percentage of fluorochemical solution in the foam, flow rate of the foam, and speed of carpet through the oven (dryer speed). Other factors include the wet pick-up (ratio of the weight of foam applied to the dry weight of the face fiber), and blow ratio (ratio of the volume of air to the volume of liquid mixed in the foam generator).

One method of foam application involves directing the foam from the foam generator directly into the nip between the lower nip roll and underside of the secondary carpet. Any excess foam drips off and forms a foam puddle underneath the secondary backing. A slide or dam device may be installed to hold excess foam near the nip roll, until the foam is picked-up and nipped onto the secondary backing by rotation of the roll through the foam puddle.

Typically, commercially available fluorochemical solutions contain about 5 to about 40% by weight active ingredient (fluorochemical). In this invention, the amount of fluorochemical solution applied will be generally in the range of about 0.05 to about 1.0 oz. per square yard of secondary backing, and approximately the same amounts may be applied in either foam or spray application. Preferably, about 0.15 to about 0.30 oz. of fluorochemical solution per square yard of secondary backing is applied. However, it is understood that the amount of fluorochemical solution applied will be adjusted depending upon the type and concentration of fluorochemical in the solution, density of the carpet face fiber, tightness or closeness of the secondary backing (woven or non-woven), and the amount of latex or other adhesive used. In any event, it is important that a sufficient amount of fluorochemical be applied onto the underside of the secondary backing in order that the secondary backing is rendered impervious to aqueous solutions in accordance with the testing methods described below.

It is preferred that the fluorochemical be applied onto the underside of the secondary backing in order to maintain other desired carpet properties such as tuft bind and delamination strength. However, it is understood that the fluorochemical may be applied to the upper surface of the secondary backing, provided that the fluorochemical is first dried and cured before the secondary backing is laminated to the adhesive-coated primary backing.

In addition, the fluorochemical may be applied onto the underside of a finished carpet having a secondary backing.

The present invention is further illustrated by the following examples, but these examples should not be considered as limiting the scope of the invention.

Testing Methods

Staining Test

Mix 45 grams of a cherry flavored, sugar sweetened, Kool-Aid powder in 500 ml of water. Allow solution to reach room temperature (75° +/− 5° F.) before using. Place the carpet sample with the secondary backing touching a white absorbent paper towel. In the case of a unitary backed carpet where there is no secondary backing, place the sample with the adhesive (latex)-coated side touching a white absorbent paper towel. Pour 20 ml of Kool-Aid onto the carpet sample from the face fiber side through a 1½" diameter cylinder from a height of about 6 cm. to create a circular stain. Remove cylinder and mechanically work the solution into the tufts, e.g., by hand, in order to obtain uniform staining. Let the sample stay undisturbed for 30 min. Lift the sample at the end of 30 minutes and look for visual red staining on the white absorbent paper. Room temperature water can be substituted for the Kool-Aid solution as a staining liquid. If considerable amount of a staining solution has passed through the carpet sample, a severe staining will be visible. The sample will be termed as substantially impervious if none or a very slight amount of liquid has passed through the carpet sample leaving none or a few visible drops of staining on a white absorbent towel.

Soiling Test

Carpet samples were installed on a commercially available underlay and were subjected to actual walk-on traffic cycles of about 158,000 foot traffics. The samples were vacuumed daily and at the end of 158,000 cycles, the soiled carpets were commercially cleaned using a hot wet extraction cleaning method with a detergent/water solution. A portion of the soiled sample was left uncleaned for comparison purposes. Cleaned and uncleaned samples were evaluated with a visual rating scale of 1 to 10, where 1=cleaned, unsoiled and 10=heavily soiled.

EXAMPLES

Example 1

A finished residential mill carpet sample having nylon 6,6 face fiber (40 oz., cut pile, about ¾ inch pile height), polypropylene primary and secondary backings and a latex adhesive, had sprayed onto the underside of its secondary backing an aqueous solution containing 10 percent by weight of the fluorochemical solution, "TEFLON" MF (available from DuPont Co.) at an approximate 15 weight percent wet pick-up. The sample was allowed to dry at room temperature (70° +/− 5° F.) for approximately 12 hours. The treated sample was then installed on a commercial underlay, with a white paper towel underneath the secondary backing and then stained on the face fiber with water as described in the above Staining Test. An installed control sample, which was identical in construction to the sample described above, except the underside of its secondary backing was not subjected to fluorochemical treatment, was also tested for staining underneath for comparison. The treated sample did not show any staining on the paper towel after 30 minutes and even after 24 hours, while the paper towel underneath the control carpet was totally soaked with water even after just 2 minutes.

Example 2

A 40 oz. cut pile (about ¾ inch pile height), carpet sample was constructed by tufting nylon 6,6 bulked continuous filament (BCF) yarn into a polypropylene primary backing. The face fiber of the dyed carpet was treated with an acid dye stain resist treatment and with a topical fluorochemical, "ZONYL" 1250 (an anionic carbamate type fluorochemical solution available from DuPont Co.), giving an approximate level of 500 ppm of fluorine on the face fiber. The sample was coated with 33 oz. of a carboxylated styrene-butadiene rubber (SBR) latex adhesive, Type V-9370 available from Colloids, Inc. and a polypropylene secondary backing was applied. This finished carpet sample was then cut into several pieces for treatment with various levels of fluorochemical. Fluorochemical was sprayed onto the underside of the secondary backing, unless otherwise indicated. The fluorochemical, "ZONYL" 1250 was used for this test. All treated samples were cured in a drying oven at 250° F. for 15 min. and brought to room temperature before stain testing. The results of the 30 minute Staining Test are described below:

| Item no. Test | Fluorine level* (ppm) | Fluorochemical Application | Stain Results |
|---|---|---|---|
| 2-1 | 100 | Underneath SCB** | Stained |
| 2-2 | 200 | " | No stain |
| 2-3 | 300 | " | No stain |
| 2-4 | 400 | " | No stain |
| 2-5 | 500 | " | No stain |
| 2-6 | 500 | On the face fiber (additional) | Stained |
| 2-7 (control) | None | None | Stained |

*Fluorochemical applied to the underside of the secondary backing, except for sample no. 2-6, where it was applied, as an additional amount, to the face fiber.
**SCB is secondary backing The results show that sample no. 2-7 (control) and sample no. 2-1, where the fluorochemical treatment was insufficient (about 100 ppm), failed the Staining Test. Also, sample no. 2-6, where an additional amount of 500 ppm of fluorine was applied onto the face fiber but none was applied underneath the secondary backing, failed the Staining Test. These results indicate that the samples must have an adequate fluorochemical treatment underneath the secondary backing and merely applying additional amount of fluorochemical onto the face fiber is not sufficient to pass the Staining Test. All other samples having sufficient fluorine treatment underneath the backing, passed the Stain test.

Example 3

Carpet samples (33 oz., beige colored, cut pile (about ¾ inch pile height, nylon 6,6 BCF) were treated with various levels of "ZONYL" 1250 fluorochemical on the underside of the secondary backings, as described above in Example 2. The treated samples were heat-cured at 250 F. for 15 minutes. A control sample with no fluorochemical applied to the underside of the secondary backing was used for comparison purposes. All samples, including the control, had a topical fluorochemical application (approximately 500 ppm of fluorine) on the face fiber in order to impart soil resistance. The samples were installed on a commercial underlay and were subjected to 158,000 foot-traffics for a Soiling Test. These samples were vacuumed daily for the entire period of the soil test. At the end of 158,000 cycles, a portion of each of the soiled and trafficked carpet samples was cleaned using an anionic/nonionic detergent-water solution in a commercial hot-wet extraction or "steam" cleaning method. The cleaned and uncleaned samples were then visually evaluated for soiling using a rating scale as described in the Soiling Test method. The results are described below:

| Visual Rating Evaluation for Samples after 158,000 Foot Traffic Cycles | | | |
|---|---|---|---|
| | | Visual Rating | |
| Sample | Fluorine Level* | Uncleaned | Cleaned |
| Control | 0 | 7.5 | 3.5 |
| 3-1 | 200 ppm | 7.0 | 3.2 |
| 3-2 | 300 ppm | 7.0 | 3.2 |
| 3-3 | 400 ppm | 6.5 | 3.0 |
| 3-4 | 500 ppm | 6.5 | 3.0 |

*on underside of secondary backing

It was quite unexpected that although the fluorochemical treatment was applied to the underside of the secondary backing, the results show that all the test specimens have a better soil rating than that of the control. Samples with higher amount of fluorochemical treatment showed better soiling results in terms of both initial soil rating and also after-cleaning. Generally, a visual rating difference of 0.5 units is discernible to an expert and about a 1 unit difference is noticeable to people who are not that familiar with soil ratings.

Example 4

The control and the treated carpet samples from the above Example 3, were placed on a brown, absorbent paper sheet, commercially installed and then cleaned using a truck mounted, hot-wet extraction machine with 12 passes of cleaning and extraction. The samples were removed at the end of the cleaning and observations were made to feel for any dampness on the underneath of the backing and/or any wetness on the brown paper due to cleaning solution passing through the backing. The results showed that the backing was completely dry for all the samples which had fluorochemical applied to the underside of their secondary backing and there were no signs of water on the brown paper underneath the backing. The backing of the control sample was slightly damp and showed multiple droplets of the cleaning solution on the brown paper.

Example 5

The backing of a 33 oz., cut pile (about ¾ inch pile height) nylon BCF carpet sample, having only a polypropylene primary (unitary) backing, was treated with approximately 32 oz./ square yard of a latex adhesive. The underneath of the latex-treated backing was sprayed with a solution containing 10% by weight of "ZONYL" 1250 fluorochemical solution at an approximate wet pick-up of 15 weight %. This unitary backed carpet sample, with no secondary backing, was oven dried at 250° F. for 15 minutes. After being subjected to the Staining Test, the carpet showed no staining underneath the latex-coated side after 30 minutes and even after 24 hours.

Example 6

A 33 oz., cut-pile (about ¾ inch pile height) nylon BCF carpet sample having woven polypropylene primary and secondary backings was used in this example.

An aqueous solution containing 18% by weight of "ZONYL" 1250 fluorochemical solution was mixed with 3 grams per liter of a foaming agent, KAF 300S, available from Peach State Labs. The foamable fluorochemical solution was applied through a foamer at an approximate flow rate of 1 gallon/min with a blow ratio of 19:1 to the underside of the secondary backing. With an estimated wet pick-up of 3–8%, this foam process applies about 0.20–0.30 oz. of the "ZONYL" 1250 fluorochemical solution per square yard of secondary backing. The sample was then passed between press (nip) rolls and through a latex curing oven at a dryer speed of 70 feet/min and at an oven temperature of 350° to 400° F. to cure the latex and the fluorochemical. The fluorochemical treated finished carpet imparted sufficient imperviousness to the secondary backing to pass the Staining Test, whereas an untreated but otherwise identical control sample failed the Staining Test.

What is claimed is:

1. A method for constructing a carpet having a secondary backing which is substantially impervious to aqueous solutions, comprising the steps of:
    a) forming a carpet comprising a primary backing having a surface with projecting tufts of yarn and an underside and a secondary backing, said secondary backing having a surface and an underside, wherein the underside of the primary backing is adhered to the surface of the secondary backing;
    b) applying a fluorochemical onto the underside of the secondary backing; and
    c) drying and curing the fluorochemical to render the secondary backing substantially impervious to aqueous solutions.

2. The method of claim 1, wherein the tufts of yarn are polyamide yarns.

3. The method of claim 1, wherein the fluorochemical is applied onto the underside of the secondary backing as a fluorochemical solution containing 5 to 40% by weight fluorochemical, said solution being applied in an amount of 0.05 to 1.0 ounces per square yard of secondary backing.

4. The method of claim 1, wherein the fluorochemical is dried and cured by heating the carpet having the secondary backing at a temperature in the range of 250° to 400° F.

5. The method of claim 1, wherein the fluorochemical is dried and cured at room temperature.

6. A method for constructing a carpet having a secondary backing which is substantially impervious to aqueous solutions, comprising the steps of:
    a) applying a fluorochemical onto a secondary backing having a surface and an opposing underside, wherein the fluorochemical is applied to the underside of the secondary backing; and
    b) contacting the surface of the secondary backing with a primary backing having tufts of yarn projecting from its surface and an adhesive-coated underside to form a carpet having a secondary backing which is substantially impervious to aqueous solutions.

7. A method for making a carpet having a secondary backing substantially impervious to aqueous solutions, comprising adhering a tufted primary backing to a secondary backing having a surface and opposing underside, wherein a sufficient amount of fluorochemical is cured onto the surface of the underside to render the secondary backing substantially impervious to aqueous solutions.

8. A method for rendering a secondary backing of a carpet comprising a tufted primary backing and secondary backing substantially impervious to aqueous solutions, comprising applying a sufficient amount of fluorochemical onto the underside of the secondary backing to render the secondary backing substantially impervious to aqueous solutions.

9. A tufted pile carpet having a secondary backing substantially impervious to aqueous solutions, comprising:
    a) a primary backing having a surface tufted with pile yarns and an underside; and
    b) a secondary backing having a surface and an underside, wherein the surface of the secondary backing is adhered to the underside of the primary backing, and the underside of the secondary backing is coated with a sufficient amount of fluorochemical to render the secondary backing substantially impervious to aqueous solutions.

10. The carpet of claim 9, wherein the pile yarns are polyamide yarns.

* * * * *